(12) United States Patent
Arras et al.

(10) Patent No.: US 12,710,305 B2
(45) Date of Patent: Aug. 18, 2026

(54) METHOD AND DEVICE FOR DETECTING AN IMPAIRMENT OF A LEVER SENSOR

(71) Applicant: Bayerische Motoren Werke Aktiengesellschaft, Munich (DE)

(72) Inventors: Emmanuel Arras, Munich (DE); Michael Buhl, Grafing (DE); Attila Farkas, Munich (DE); Stefan Schott, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 266 days.

(21) Appl. No.: 18/726,154

(22) PCT Filed: Feb. 3, 2023

(86) PCT No.: PCT/EP2023/052701

§ 371 (c)(1),
(2) Date: Jul. 2, 2024

(87) PCT Pub. No.: WO2023/148338

PCT Pub. Date: Aug. 10, 2023

(65) Prior Publication Data

US 2025/0067591 A1 Feb. 27, 2025

(30) Foreign Application Priority Data

Feb. 3, 2022 (DE) ..................... 10 2022 102 535.7

(51) Int. Cl.
*G01F 25/20* (2022.01)
*B60K 15/03* (2006.01)
(Continued)

(52) U.S. Cl.
CPC .............. *G01F 25/20* (2022.01); *B60K 15/03* (2013.01); *G01F 23/44* (2013.01); *B60K 2015/03217* (2013.01)

(58) Field of Classification Search
CPC .... G01F 23/284; G01F 23/2962; G01F 25/20; G01F 23/268; G01F 23/296;
(Continued)

(56) References Cited

U.S. PATENT DOCUMENTS 9,829,370 B2 * 11/2017 Dudar ..................... G01F 23/32
11,577,602 B2 * 2/2023 Urdl ........................ G01F 23/76
(Continued)

FOREIGN PATENT DOCUMENTS

CN 105784072 B 10/2018
DE 4021598 A1 * 1/1992 ............. G01F 23/32
(Continued)

OTHER PUBLICATIONS

International Search Report (PCT/ISA/210) issued in PCT Application No. PCT/EP2023/052701 dated May 4, 2023 with English translation (5 pages).
(Continued)

*Primary Examiner* — Andre J Allen
(74) *Attorney, Agent, or Firm* — Crowell & Moring LLP

(57) ABSTRACT

A device for recognizing an impairment of a lever sensor, wherein the lever sensor detects measured values with respect to a filling level of a liquid container of a motor vehicle. The device determines a maximum measured value and a minimum measured value of the lever sensor in a time and/or distance interval of a first phase. The device further determines, in a second phase following the first phase, proportion information relating to a proportion of a time and/or distance interval of the second phase, for which the measured values of the lever sensor lie within a minimum value range for the minimum measured value of the first phase and/or within a maximum value range for the maxi-
(Continued)

mum measured value of the first phase, and recognizes an impairment of the lever sensor on the basis of the proportion information.

14 Claims, 3 Drawing Sheets

(51) Int. Cl.
*G01F 23/32* (2006.01)
*G01F 23/44* (2006.01)
(58) Field of Classification Search
CPC ...... G01F 23/292; G01F 23/00; G01F 23/804; G01F 23/266; G01F 23/263; G01F 23/2967; G01F 23/80; G01F 23/26; G01F 22/00; G01F 23/265; G01F 23/2968; G01F 23/22; G01F 23/0007; G01F 23/24; G01F 23/14; G01F 23/802; G01F 23/2966; G01F 23/2921; G01F 23/28; G01F 23/02; G01F 23/288; G01F 23/18; G01F 23/74; G01F 23/20; G01F 23/242; G01F 17/00; G01F 23/2961; G01F 25/24; G01F 23/36; G01F 23/2965; G01F 23/241; G01F 23/38; G01F 22/02; G01F 23/2845; G01F 23/30; G01F 23/2928; G01F 23/72; G01F 23/76; G01F 23/04; G01F 23/246; G01F 23/247; G01F 19/00; G01F 23/261; G01F 25/10; G01F 1/007; G01F 1/002; G01F 23/243; G01F 11/284; G01F 23/32; G01F 23/68; G01F 13/006; G01F 23/363; G01F 23/2885; G01F 1/74; G01F 23/0023; G01F 1/58; G01F 23/2925; G01F 23/64; G01F 11/28; G01F 1/588; G01F 13/00; G01F 25/0092; G01F 23/2927; G01F 23/62; G01F 15/14; G01F 1/662; G01F 23/2922; G01F 1/667; G01F 23/248; G01F 1/00; G01F 1/584; G01F 25/0084; G01F 11/262; G01F 1/60; G01F 23/0038; G01F 1/66; G01F 15/063; G01F 23/0015; G01F 23/164; G01F 1/86; G01F 11/021; G01F 15/18; G01F 23/185; G01F 11/24; G01F 23/16; G01F 23/0046; G01F 15/005; G01F 11/029; G01F 11/32; G01F 23/70; G01F 23/808; G01F 1/34; G01F 25/17; G01F 3/38; G01F 25/00; G01F 23/56; G01F 23/58; G01F 15/08; G01F 23/282; G01F 1/586; G01F 23/168; G01F 23/162; G01F 1/8436; G01F 23/46; G01F 1/663; G01F 11/286; G01F 15/061; G01F 9/001; G01F 15/02; G01F 23/806; G01F 23/60; G01F 11/00; G01F 11/263; G01F 15/0755; G01F 25/22; G01F 23/003; G01F 23/686; G01F 1/8431; G01F 15/00; G01F 23/244; G01F 23/303; G01F 1/52; G01F 23/161; G01F 23/226; G01F 23/2924; G01F 23/44; G01F 23/34; B60K 20/02; B60K 35/10; B60K 6/48; B60K 26/02; B60K 35/28; B60K 35/22; B60K 2006/4825; B60K 2006/268; B60K 6/387; B60K 6/547; B60K 6/46; B60K 17/02; B60K 20/00; B60K 2015/03217; B60K 6/26; B60K 35/215; B60K 20/04; B60K 7/0007; B60K 23/02; B60K 35/60; B60K 35/29; B60K 35/80; B60K 2360/61; B60K 35/81; B60K 15/03; B60K 31/00; B60K 17/28; B60K 2360/167; B60K 23/08; B60K 15/077; B60K 17/10; B60K 20/08; B60K 2360/1438; B60K 28/10; B60K 2360/172; B60K 26/021; B60K 35/654; B60K 6/485; B60K 23/0808; B60K 2360/111; B60K 35/20; B60K 35/85; B60K 2360/11; B60K 28/14; B60K 35/65; B60K 2360/126; B60K 35/23; B60K 6/38; B60K 1/04; B60K 35/26; B60K 31/042; B60K 6/12; B60K 2360/168; B60K 35/50; B60K 2007/0061; B60K 2360/128; B60K 35/00; B60K 35/21; B60K 2360/115; B60K 35/25; B60K 17/356; B60K 2007/0092; B60K 2360/113; B60K 2360/119; B60K 25/06; B60K 17/06; B60K 20/06; B60K 2001/0416; B60K 2007/0038; B60K 2360/135; B60K 1/00; B60K 17/08; B60K 2360/122; B60K 35/213; B60K 35/265; B60K 1/02; B60K 2015/03111; B60K 35/212; B60K 35/658; B60K 6/24; B60K 6/28; B60K 6/442; B60K 6/445; B60K 2015/03467; B60K 2360/117; B60K 2360/145; B60K 2360/151; B60K 28/04; B60K 35/214; B60K 6/365; B60K 6/40; B60K 17/3462; B60K 25/02; B60K 28/16; B60K 35/90; B60K 15/03519; B60K 17/34; B60K 17/346; B60K 17/3467; B60K 2015/03138; B60K 2360/174; B60K 2360/178; B60K 2360/182; B60K 25/00; B60K 28/12; B60K 6/543; B60K 15/03504; B60K 2026/022; B60K 2026/029; B60K 2310/20; B60K 2360/143; B60K 2360/166; B60K 2360/741; B60K 28/063; B60K 28/08; B60K 35/235; B60K 17/00; B60K 17/16; B60K 17/344; B60K 2001/001; B60K 2015/0775; B60K 2025/022; B60K 2360/1442; B60K 37/00; B60K 13/04; B60K 15/061; B60K 17/348; B60K 17/35; B60K 2001/0422; B60K 2015/03105; B60K 2015/0344; B60K 2015/03453; B60K 2015/03514; B60K 2015/03576; B60K 2026/025; B60K 2360/1523; B60K 2360/186; B60K 2360/1868; B60K 2360/1876; B60K 2360/21; B60K 7/0015; B60K 11/04; B60K 15/035; B60K 17/04; B60K 23/00; B60K 2360/176; B60K 2360/188; B60K 2360/195; B60K 2360/332; B60K 2360/566; B60K 26/00; B60K 28/02; B60K 15/073; B60K 17/046; B60K 17/22; B60K 2015/03509; B60K 2025/024; B60K 2026/046; B60K 2031/0091; B60K 2360/131; B60K 2360/139; B60K 2360/1434; B60K 2360/1446; B60K 2360/191; B60K 2360/573; B60K 31/18; B60K 5/04; B60K 6/52; B60K 6/54; B60K 15/03006; B60K 15/03177; B60K 15/05; B60K 17/043; B60K 17/165; B60K 17/354; B60K 2015/03032; B60K 2015/03085; B60K 2015/03236; B60K 2023/085; B60K 2025/026; B60K 2360/161; B60K 2360/162; B60K 2360/169; B60K 2360/782; B60K 26/04; B60K 28/00; B60K 35/53; B60K 6/383; B60K 6/448; B60K 11/08; B60K 2001/0411; B60K 2001/0438; B60K 2001/0455; B60K 2001/0494; B60K 2006/4816; B60K 2007/0046; B60K 2015/03118; B60K 2015/0319; B60K 2015/03361; B60K 2015/0346; B60K 2015/03473; B60K 2360/1464; B60K 2360/589; B60K 28/066; B60K 31/0008; B60K 31/08; B60K 37/20; B60K 6/36; B60K 15/04; B60K 17/14; B60K 17/342; B60K 2015/03026; B60K 2015/03046; B60K 2015/03171; B60K 2023/0858; B60K 2026/023; B60K 2360/1515; B60K 2360/16; B60K 2360/164; B60K 2360/171; B60K 2360/175; B60K 2360/179; B60K 2360/184; B60K 2360/197; B60K 2360/199; B60K 2360/20; B60K 2360/27; B60K 2360/31; B60K 2360/33; B60K 2360/336; B60K 2360/34; B60K 2360/341; B60K 2360/343; B60K 2360/48; B60K 2360/55; B60K 2360/583; B60K 2360/688; B60K 2360/695; B60K 2360/698; B60K 2360/797; B60K 2360/834; B60K 28/06; B60K 6/30; B60K 17/30; B60K 2001/045; B60K 2001/0477; B60K 2001/0488; B60K 2006/4841; B60K 2015/03078; B60K 2015/03164; B60K 2015/03223; B60K 2015/03256; B60K 2015/03328; B60K 2015/03447; B60K 2015/0515; B60K 2025/005; B60K 2026/028; B60K 2360/141; B60K 2360/146; B60K 2360/563; B60K 2360/577; B60K 31/047; B60K 31/12; B60K 6/00; B60K 11/085; B60K 15/0403; B60K 15/0406; B60K 17/105; B60K 17/3505; B60K 2001/005; B60K 2006/266; B60K 2006/381; B60K 2006/4808; B60K 2006/541; B60K 2007/0069; B60K 2007/0076; B60K 2015/03019; B60K 2015/03144; B60K 2015/0321; B60K 2015/03243; B60K 2015/03289; B60K 2015/03368; B60K 2015/03427; B60K 2015/03434; B60K 2015/0348; B60K 2015/03538; B60K 2015/03547; B60K 2015/03566; B60K 2015/0358; B60K 2015/0359; B60K 2015/0477; B60K 2023/0833; B60K 2028/003; B60K 23/06; B60K 2360/1468; B60K 2360/165; B60K 2360/5915; B60K 31/04; B60K 6/20; B60K 6/42; B60K 6/50

See application file for complete search history.

(56) References Cited

U.S. PATENT DOCUMENTS

| | | | | |
|---|---|---|---|---|
| 2009/0205418 | A1 | 8/2009 | Barcin et al. | |
| 2011/0010070 | A1 | 1/2011 | Bohr et al. | |
| 2014/0190246 | A1 * | 7/2014 | Guo | G01F 25/20 73/114.54 |
| 2016/0313171 | A1 | 10/2016 | Dudar et al. | |
| 2018/0143065 | A1 | 5/2018 | Klimesch | |
| 2019/0101432 | A1 | 4/2019 | Liang et al. | |
| 2024/0210231 | A1 * | 6/2024 | Arras | G01F 23/14 |

FOREIGN PATENT DOCUMENTS

| | | | | |
|---|---|---|---|---|
| DE | 19842243 | A1 * | 4/2000 | G01F 23/36 |
| DE | 10 2004 003 178 | A1 | 8/2005 | |
| DE | 10 2004 051 148 | B4 | 10/2007 | |
| DE | 10 2008 009 154 | A1 | 8/2009 | |
| DE | 10 2010 026 230 | A1 | 1/2011 | |
| DE | 10 2010 043 931 | A1 | 5/2012 | |
| DE | 10 2012 203 190 | A1 | 9/2013 | |
| DE | 10 2016 222 849 | A1 | 5/2018 | |
| DE | 102022117504 | A1 * | 1/2024 | G01F 23/36 |

OTHER PUBLICATIONS

German-language Written Opinion (PCT/ISA/237) issued in PCT Application No. PCT/EP2023/052701 dated May 4, 2023 with English translation (9 pages).

German-language Search Report issued in German Application No. 10 2022 102 535.7 dated Sep. 16, 2022 with partial English translation (10 pages).

German-language Office Action issued in German Application No. 10 2022 102 535.7 dated Apr. 30, 2025 (4 pages).

* cited by examiner

METHOD AND DEVICE FOR DETECTING AN IMPAIRMENT OF A LEVER SENSOR

BACKGROUND AND SUMMARY

The technology disclosed herein relates to a method and a corresponding device for detecting an impairment of a lever sensor.

A vehicle typically has one or more liquid containers for receiving liquid operating fluids. In particular, the vehicle may have a container for receiving fuel. Alternatively or additionally, the vehicle may have a container for receiving washer fluid for cleaning a window of the vehicle.

The filling level of a liquid container of a vehicle may be determined on the basis of a lever sensor, the lever sensor typically having a float which is designed to float on the surface of the liquid in the liquid container.

During the operation of the vehicle, an impairment of the lever sensor may occur, so that the filling level of the liquid container can no longer be reliably and/or precisely determined. It may in particular in this case happen that the lever sensor is stuck in one particular position.

It is an object of the technology disclosed herein to lessen or eliminate at least one disadvantage of a previously known solution or to propose an alternative solution. It is in particular an object of the technology disclosed herein to detect an impairment of a lever sensor of a vehicle in an efficient and reliable way. Further preferred objects may arise from the advantageous effects of the technology disclosed herein.

According to one aspect, a device (for instance a control unit) for detecting an impairment of a lever sensor of a motor vehicle is described. Detected as an impairment may be in particular that the lever sensor is stuck. The lever sensor may be set up to record measured values with respect to the filling level of a liquid container of the motor vehicle. The liquid container may in this case be for example a fuel container for receiving a fuel (for instance gasoline or diesel) for the operation of an internal combustion engine of the vehicle. Alternatively, the liquid container may be designed to receive washer fluid for a wiper system of the vehicle.

The lever sensor may be designed to provide measured values at a specific measuring rate or measuring frequency (for example of 0.1 Hz or more, or of 1 Hz or more, or 10 Hz or more). The measured values may in this case assume values between a minimum possible measured value (for example for an empty liquid container) and a maximum possible measured value (for example for a completely filled liquid container). The lever sensor may have a specific measured-value resolution. For example, the lever sensor may be designed in such a way that the lever sensor can provide (only and/or exactly) N different values between the minimum possible measured value and the maximum possible measured value. The number N of possible measured values that can be provided by the lever sensor may for example be restricted to 100 or less, or to 50 or less or to 40 or less. The measured values may be in each case resistance values.

The device is set up to determine (during a journey of the vehicle) a maximum measured value and a minimum measured value of the lever sensor in a time and/or distance interval of a first phase. The time and/or distance interval may be for example 5-10 minutes and/or 5-10 km long. In the time and/or distance interval, measured values may be determined (at the measuring rate or measuring frequency of the lever sensor), and the maximum measured value and the minimum measured value of the set of measured values determined in the first phase may be identified (and possibly stored). If a time interval is used, it can be checked whether the vehicle is also actually moving or whether the vehicle is stationary. Possibly, only the periods of time in which the vehicle is actually moving are taken into account for determining the time interval. A period of time in which the vehicle is stationary may possibly be left out of the time interval.

The device is also set up to determine in a second phase, following the first phase, proportion information with respect to the proportion of the time and/or distance interval of the second phase for which the measured values of the lever sensor lie within a minimum value range for (in particular around) the minimum measured value of the first phase and/or within a maximum value range for (in particular around) the maximum measured value of the first phase. The time and/or distance interval of the second phase may be for example 5-10 minutes and/or 5-10 km long. In the time and/or distance interval, measured values may be determined (at the measuring rate or measuring frequency of the lever sensor), with the measured values determined or recorded in the second phase forming an overall set of measured values.

The minimum value range may possibly only comprise the minimum measured value, and the maximum value range may possibly only comprise the maximum measured value (in particular whenever the number N of different possible measured values of the lever sensor is relatively small, for instance $N \leq 40$ or $N \leq 60$).

Alternatively or additionally, the minimum value range for the minimum measured value of the first phase may comprise values and/or be limited to values which lie ±5% or less or ±1% or less around the minimum measured value of the first phase. Furthermore, the maximum value range for the maximum measured value of the first phase may comprise values and/or be limited to values which lie ±5% or less ±1% or less around the maximum measured value of the first phase. Value ranges around the minimum or maximum measured value may be considered in order to reduce the influence of measurement noise.

As already explained further above, in one example the minimum value range corresponds (exactly) to the minimum measured value and/or the maximum value range corresponds (exactly) to the maximum measured value. This may be the case in particular whenever the number N of possible measured values is relatively small, so that only relatively few discrete measured values can be recorded. In this case, typically no measurement noise occurs, so that the minimum measured value and the maximum measured value can be respectively used directly as value ranges (the respective value range only having in each case one measured value).

Consequently, the proportion of measured values that lie (either) in the minimum value range or in the maximum value range may be determined from the overall set of measured values of the second phase as proportion information.

Furthermore, the device is set up to detect an impairment (in particular sticking) of the lever sensor on the basis of the proportion information. For this purpose, the determined proportion of the time and/or distance interval of the second phase may be compared with a proportion threshold value. The proportion threshold value may in this case be for example 10% or greater or 20% or greater (for example between 10% and 30%) of the overall set of measured values.

It can then be determined in a particularly reliable way on the basis of the comparison whether or not there is an impairment of the lever sensor. In particular, it may be determined that there is an impairment of the lever sensor if the determined proportion is equal to or greater than the proportion threshold value. Alternatively or additionally, it may be determined that there is no impairment of the lever sensor if the determined proportion is less than the proportion threshold value.

The evaluation of measured values of the lever sensor in two different phases and the determination of proportion information allow an impairment of the lever sensor to be detected in an efficient and reliable way.

The device may be set up to determine a first proportion of the time and/or distance interval of the second phase for which the measured values of the lever sensor lie within the minimum value range. In other words, a first proportion of the measured values that lies in the minimum value range may be determined from the overall set of measured values of the second phase. Furthermore, the device may be set up to determine a second proportion of the time and/or distance interval of the second phase for which the measured values of the lever sensor lie within the maximum value range. In other words, a second proportion of the measured values that lies in the maximum value range may be determined from the overall set of measured values of the second phase.

It can then be determined in a particularly reliable and precise way on the basis of the first proportion and on the basis of the second proportion, in particular on the basis of the sum of the first proportion and the second proportion, whether or not there is an impairment of the lever sensor. In particular, for this purpose the sum of the first proportion and the second proportion may be compared with the proportion threshold value, and it can be determined on the basis of the comparison whether or not there is an impairment of the lever sensor.

The device may be set up to identify on the basis of movement data of a movement sensor (for example a speed sensor, an acceleration sensor and/or an inertial measuring unit) of the vehicle a time and/or distance interval for the first phase in which the longitudinal and/or transverse acceleration of the vehicle changes by at least a predefined change threshold value. This time and/or distance interval can then be used for determining the maximum measured value and the minimum measured value of the first phase.

Alternatively or additionally, the device may be set up to determine on the basis of the movement data whether or not the longitudinal and/or transverse acceleration of the vehicle changes by at least the predefined change threshold value within the (already selected) time and/or distance interval of the first phase. The maximum measured value and the minimum measured value of the lever sensor of the first phase are preferably only used for detecting an impairment of the lever sensor whenever the longitudinal and/or transverse acceleration of the vehicle changes by at least the predefined change threshold value within the time and/or distance interval of the first phase.

It can consequently be ensured on the basis of the movement data of a movement sensor of the vehicle that in the first phase there is sufficiently dynamic driving of the vehicle (by which sufficiently great fluctuations of the measured values of the lever sensor are brought about). In particular, it can be checked on the basis of the movement data whether there is a sufficiently great change in acceleration of the vehicle in the first phase. It is possibly only in this case that the minimum and/or the maximum measured value is/are used for the detection of an impairment of the lever sensor. In this way, the reliability and accuracy of the detection of an impairment of the lever sensor can be further increased.

The device may be set up to determine the maximum measured value and/or the minimum measured value of the lever sensor in the time and/or distance interval of the second phase. Consequently, the minimum measured value can be determined from the overall set of measured values of the second phase. Alternatively or additionally, the maximum measured value may be determined from the overall set of measured values of the second phase.

The minimum measured value of the second phase may then be compared with the minimum measured value of the first phase. Alternatively or additionally, the maximum measured value of the second phase may be compared with the maximum measured value of the first phase. An impairment of the lever sensor can then be detected in a particularly reliable way on the basis of the one or two comparisons. In particular, it may be determined that there is an impairment of the lever sensor if the minimum measured values of the first and second phases are equal (and there has in each case been a sufficiently great change in acceleration in the first and/or second phase) and/or if the maximum measured values of the first and second phases are equal (and there has in each case been a sufficiently great change in acceleration in the first and/or second phase).

The device may be set up to determine that the minimum measured value of the first phase corresponds to the minimum possible measured value of the lever sensor. It can consequently be detected that the liquid container no longer contains any operating fluid.

Furthermore, it can be detected (for example on the basis of the data of an (injection) nozzle) that liquid is removed from the liquid container after the first phase (which is contrary to the aforementioned measurement that the liquid container is empty). On the basis of this contradiction, it can then be determined in a particularly reliable way that there is an impairment of the lever sensor.

The device may be set up to bring about a fault-related measure if it is detected that the lever sensor has an impairment. The fault-related measure may for example comprise an input in a fault memory of the vehicle and/or the output of a message to a user of the vehicle. In this way, the reliability of the motor vehicle can be increased.

According to a further aspect, a liquid container with a lever sensor is described, the liquid container comprising the device described in this disclosure.

According to a further aspect, a (road) motor vehicle (in particular a passenger car or a truck or a bus or a motorcycle) which comprises the device described in this disclosure is described.

According to a further aspect, a method for detecting an impairment of the lever sensor is described. The lever sensor may be set up to record measured values with respect to the filling level of a liquid container of a motor vehicle. The method comprises the determining of a maximum measured value and a minimum measured value of the lever sensor in a time and/or distance interval of a first phase of the method. Furthermore, the method comprises the determining in a second phase of the method, following the first phase, of proportion information with respect to a proportion of a time and/or distance interval of the second phase for which the measured values of the lever sensor lie within a minimum value range for the minimum measured value of the first phase and/or within a maximum value range for the maximum measured value of the first phase. The method also comprises the detecting of an impairment of the lever sensor on the basis of the proportion information.

According to a further aspect, a software (SW) program is described. The SW program may be set up to be run on a processor or microprocessor (for example on a control unit of a vehicle), and in order thereby to perform the method described in this disclosure.

According to a further aspect, a storage medium is described. The storage medium may comprise an SW program which is set up to be run on a processor, in order thereby to perform the method described in this disclosure. The storage medium may comprise, for example, RAM, ROM, or a hard disk drive.

It should be noted that the methods, devices and systems described in this disclosure can be used both on their own and in combination with other methods, devices and systems described in this disclosure. Furthermore, any aspects of the methods, devices and systems described in this disclosure can be combined with one another in a wide variety of ways. In particular, the features of the claims can be combined with one another in a wide variety of ways. Furthermore, features given in parentheses are to be understood as optional features.

BRIEF DESCRIPTION OF THE DRAWINGS

The disclosure is described in more detail below with reference to exemplary embodiments.

DETAILED DESCRIPTION OF THE DRAWINGS

Figure 1:
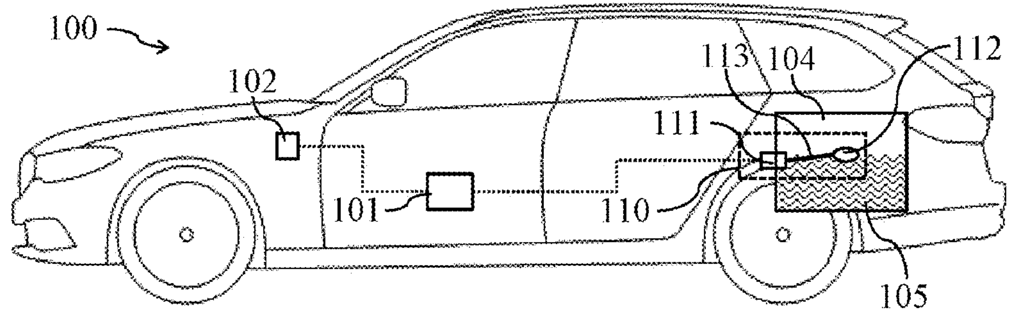
FIG. 1 shows a vehicle, given by way of example, with a liquid container.

The present disclosure is concerned with the efficient and reliable determination of the state of a lever sensor which is used to determine the filling level of a liquid container in a motor vehicle. In this connection, FIG. 1 shows a (motor) vehicle 100, given by way of example, with a liquid container 104 for receiving an operating fluid 105 of the vehicle 100. The operating fluid 105 may be for example a fuel, for instance gasoline or diesel, for operating an internal combustion engine (not shown) of the vehicle 100. Alternatively, the operating fluid 105 may be for example washer fluid for a wiper system (not shown) of the vehicle 100.

The vehicle 100 also comprises a lever sensor 110, which is set up to record measured values with respect to the height of the liquid level of the operating fluid 105 in the liquid container 104. The lever sensor 110 may for example have a float 112, which is coupled by way of a lever 113 to a measuring unit 111. The float 112 may be designed to float on the surface of the operating fluid 105 in the liquid container 104. Consequently, the height of the float 112 within the liquid container 104 depends on the liquid level, and consequently on the filling level of the operating fluid 105. The height of the float 112 can be transmitted by way of the lever 113 to the measuring unit 111, so that a measured value that indicates the height of the float 112, and with it the filling level of the liquid container 104, can be generated by the measuring unit 111. The measured variable of the measuring unit 111 may comprise for example an ohmic resistance, and a measured value of the measuring unit 111 may comprise a resistance value.

A measured value recorded by the measuring unit 111 may be evaluated by an (evaluating or control) device 101 (for example, a control unit, processor, or microprocessor) of the vehicle 100, in order to determine filling level information with respect to the filling level of the liquid container 104. A sequence of measured values for a corresponding sequence of successive points in time and/or points over a distance (of a distance traveled by the vehicle 100) may in this case possibly be averaged, in order to compensate for fluctuations of the measured values as a result of the movement of the vehicle 100.

During the operation of the vehicle 100 there may be a malfunction of the lever sensor 110. It may in this case happen in particular that the lever sensor 110 is stuck in one particular position, and as a consequence of this correct measured values can no longer be recorded. A defective lever sensor 110 may possibly be detected by analyzing the amount of liquid 105 that is removed from the liquid container 104 (for example for injection into the internal combustion engine of the vehicle 100). The amount of liquid removed from the liquid container 104 is however typically already used as an additional measured variable for the determination of the filling level information, so that this measured variable cannot be readily used for detection (independently thereof) of a malfunction of the lever sensor 110.

The vehicle 100 may comprise at least one movement sensor 102, which is set up to record sensor data with respect to the movement, in particular with respect to the driving speed and/or with respect to the longitudinal and/or transverse acceleration of the vehicle 100. The sensor data of the movement sensor 102 are also referred to in this disclosure as movement data. As described in this disclosure, the determination of the state of the lever sensor 110 can take place in an efficient and reliable way on the basis of the movement data of the one or more movement sensors 102 of the vehicle 100.

Figure 2A:
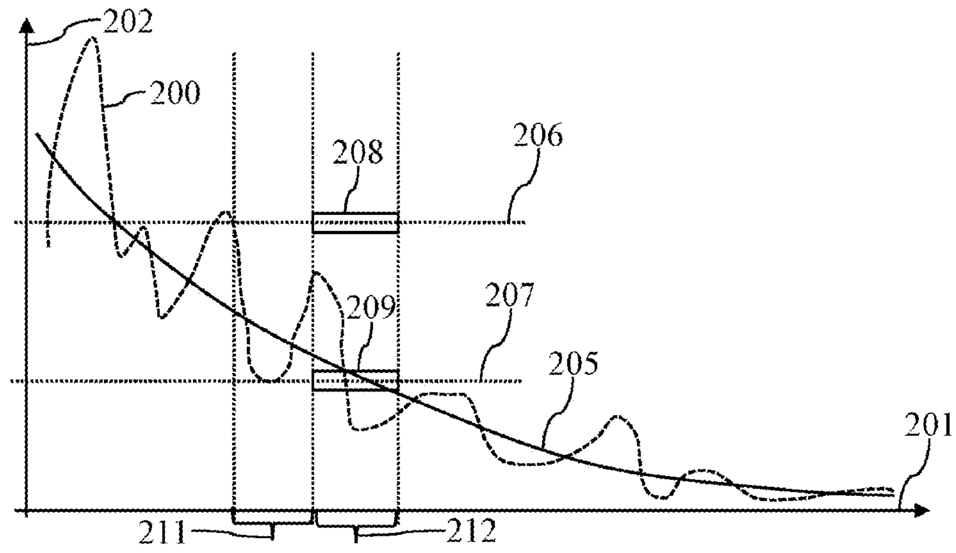
FIGS. 2*a* to 2*c* show measurement signals, given by way of example, of a lever sensor.

FIG. 2*a* shows a measurement signal 200, given by way of example, which indicates the measured values 202 of the measuring unit 111 of the lever sensor 110 as a function of the time and/or the distance traveled 201. The measurement signal 200 may for example have a temporal measured-value resolution of one measured value 202 per second (or higher). The measurement signal 200 fluctuates as a result of the movement, in particular as a result of the acceleration or the change in acceleration, of the vehicle 100 typically around an averaged measured-value progression 205, the averaged measured-value progression 205 typically indicating the effective filling level of the liquid container 104. The averaged measured-value progression 205 may be determined by low-pass filtering of the measurement signal 200.

The device 101 may be set up to evaluate the measurement signal 200 in a first phase 211 (i.e. in a first time interval, for instance of 5 minutes, or in a first distance interval, for instance of 5 km). The maximum measured value $x_{max}$ 206 and the minimum measured value $x_{min}$ 207 within the first phase 211 may in this case be determined in particular. For the maximum measured value $x_{max}$ 206 it may be the case that $x_{max} \geq x(t)$ for all measured values x(t) 202 within the first phase 211 (where t indicates the time or the distance). In a corresponding way, for the minimum measured value $x_{min}$ 207 it may be the case that $x_{min} \leq x(t)$ for all measured values x(t) 202 within the first phase 211.

Furthermore, it may be checked (on the basis of the movement data of the one or more movement sensors 102) whether in the first phase 211 the acceleration a(t) of the vehicle 100 at least at a point in time 201 is of an amount equal to or greater than a predefined acceleration threshold value $a_t$, i.e. $a(t) \geq a_t$ or $a(t) \leq -a_t$.

Alternatively or additionally, it may be checked (on the basis of the movement data of the one or more movement sensors 102) whether in the first phase 211 the maximum difference of the accelerations a(t) of the vehicle 100 during the first phase 211 is of an amount equal to or greater than a predefined change threshold value $\Delta_t$, i.e. $\Delta = a_{max} - a_{min}$; where $a_{max}$ is the maximum acceleration and $a_{min}$ is the minimum acceleration in the first phase 211; where $\Delta \geq \Delta t$.

It can consequently be checked on the basis of the movement data whether the vehicle 100 has carried out during the first phase 211 sufficiently strong changes in movement, which should lead to a substantial fluctuation of the measured values x(t) 202, i.e. to a substantial deviation between the maximum measured value $x_{max}$ 206 and the minimum measured value $x_{min}$ 207, within the first phase 211 if the lever sensor 110 is functioning faultlessly. The minimum measured value 207 and/or the maximum measured value 206 of the first phase 211 are possibly only used for the detection of an impairment of the lever sensor 110 whenever it is detected on the basis of the movement data that the vehicle 100 has carried out sufficiently strong changes in movement during the first phase 211.

Figure 4:
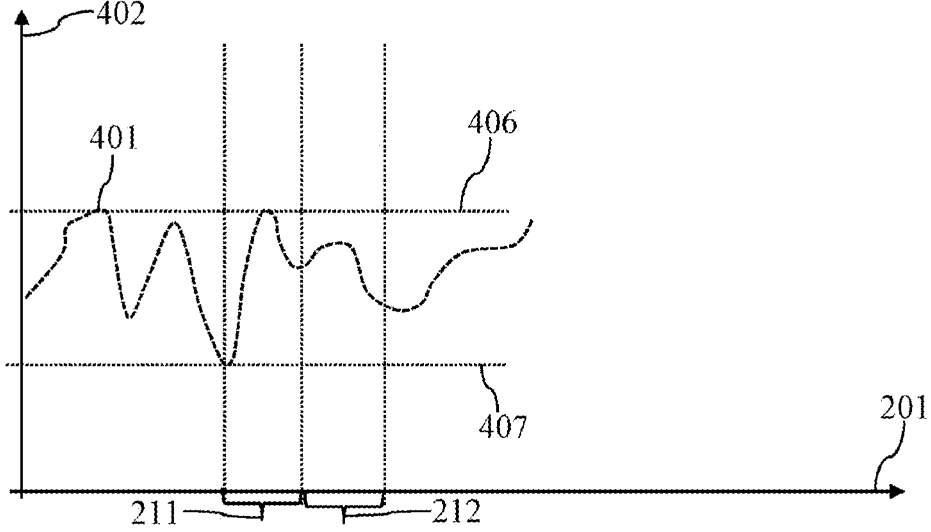

In FIG. 4, a temporal progression 401, given by way of example, of the acceleration 402 of the vehicle 100 is shown. The longitudinal acceleration, the transverse acceleration and/or a combination of longitudinal and transverse acceleration can in this case be determined. On the basis of the temporal progression 401 of the acceleration 402, a minimum acceleration value 407 and a maximum acceleration value 406 of the acceleration 402 during the first phase 211 can be determined. On the basis of this, the maximum difference of the accelerations a(t) of the vehicle 100 during the first phase 211 (i.e. maximum acceleration value 406 minus minimum acceleration value 407) can be determined and compared with the predefined change threshold value $\Delta_t$. It can then be decided on the basis of the comparison whether the minimum measured value 207 and/or the maximum measured value 206 are used for the detection of an impairment of the lever sensor 110.

In a second phase 212 (following the first phase 211), it may be determined on the basis of the previously determined maximum measured value $x_{max}$ 206 and minimum measured value $x_{min}$ 207 whether or not the lever sensor 110 is impaired, for example stuck. For this purpose, a minimum value range 209 around the minimum measured value $x_{min}$ 207 and a maximum value range 208 around the maximum measured value $x_{max}$ 206 may be considered. The value ranges 208, 209 may in this case respectively have values which lie ±10% or less (or ±5% or less) around the maximum measured value $x_{max}$ 206 and around the minimum measured value $x_{min}$ 207.

The second phase 212 may extend over a specific time interval (for example 5 minutes) and/or over a specific distance interval (for example 5 km). Then the measurement signal 200 in the second phase 212 can be evaluated, and in particular the proportion of the measured values 202 of the measurement signal 200 that lie in the minimum value range 208 and/or in the maximum value range 209 can be determined. In other words, the proportion of the (time and/or distance) interval for which the measured values 202 of the lever sensor 110 lie in the minimum value range 208 and/or in the maximum value range 209 can be determined.

On the basis of the determined proportion, it can be determined in a reliable way whether or not there is an impairment of the lever sensor 110. The determined proportion can in this case be compared with a proportion threshold value, and it can be determined on the basis of the comparison whether or not the lever sensor 110 is impaired. The proportion threshold value may be for example 10% or more or 20% or more of the entire time and/or distance interval or of the entire amount of measured values 202 of the second phase 212. If the determined proportion is greater than the proportion threshold value, it can be determined that the lever sensor 110 is impaired. On the other hand, it can be determined that the lever sensor 110 is not impaired.

Preferably, movement data are also recorded and evaluated in the second phase 212. In particular, the maximum change in acceleration existing in the second phase 212 may be determined. The determined proportion is possibly only used for the detection of an impairment of the lever sensor 110 whenever the maximum difference of the accelerations a(t) of the vehicle 100 during the second phase 212 is of an amount equal to or greater than the predefined change threshold value $\Delta_t$. In this way, the reliability of the detection of an impairment of the lever sensor 110 can be further increased.

Figure 2B:
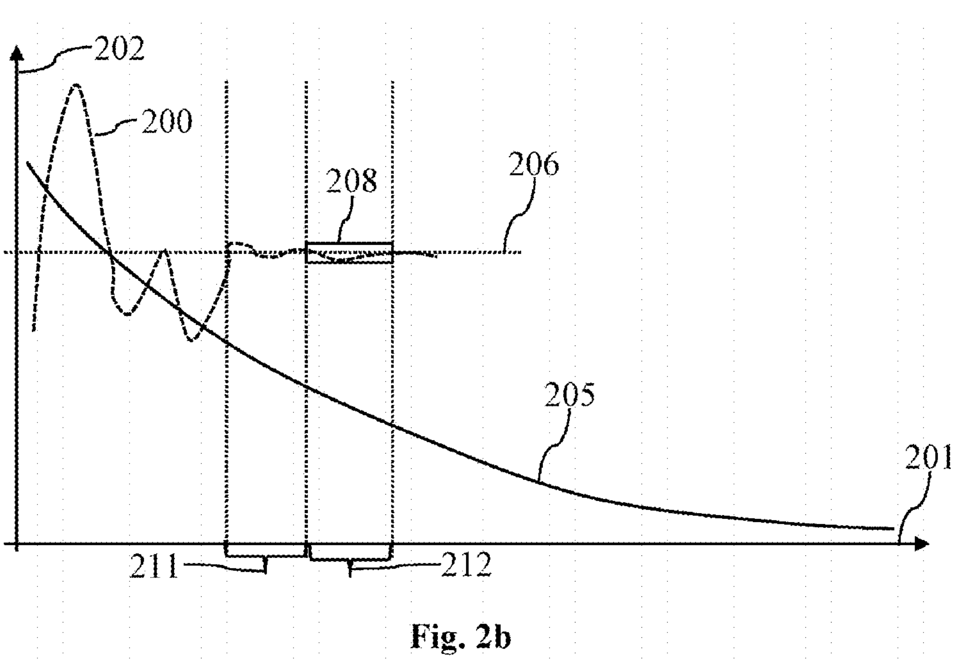
Figure 2C:
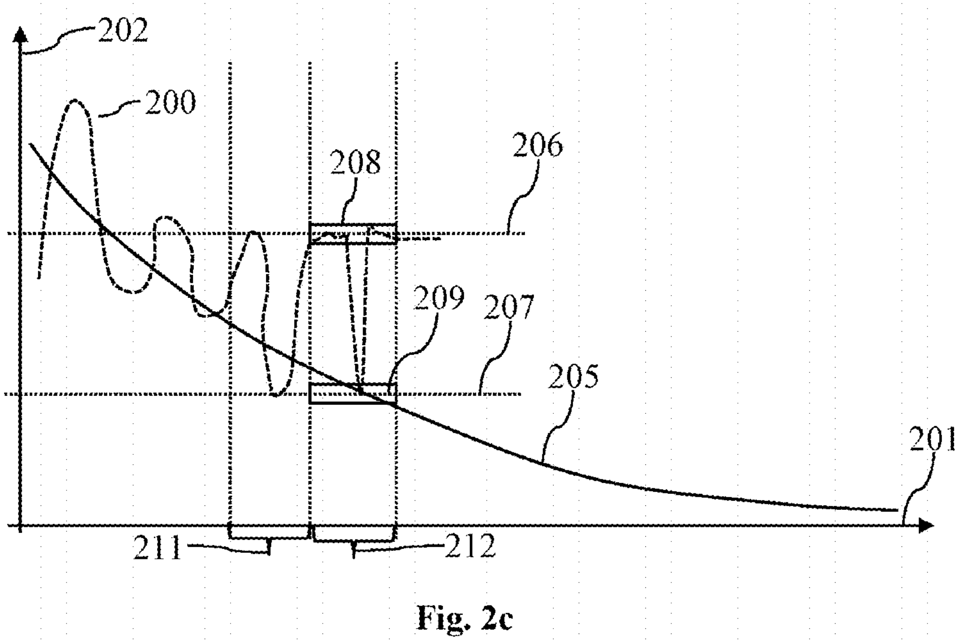

FIG. 2*a* shows a measurement signal 200, given by way of example, for a situation in which the lever sensor 110 is not impaired (and the determined proportion is less than the proportion threshold value). On the other hand, FIGS. 2*b* and 2*c* illustrate measurement signals 200 for situations in which the lever sensor 110 has an impairment. In the situation shown in FIG. 2*b*, the lever sensor 110 is stuck in a position which corresponds to the maximum measured value 206 determined for the first phase 211. In the situation shown in FIG. 2*c*, the lever sensor 110 is stuck on one side (for example lying against an obstacle) and can therefore only bring about changes in the measured value in one direction.

For the detection of a sticking lever sensor 110, consequently the longitudinal and/or transverse acceleration of the vehicle 100 can be used and set in correlation with the movement of the lever sensor 110 (with the movement of the lever sensor 110 being described by the measurement signal 200). If the lever sensor 110 does not move when there are sufficiently great accelerations of the vehicle 100, a fault can be diagnosed.

The diagnosis may be carried out in two (successive) phases 211, 212. In the first phase 211, the accelerations of the vehicle 100 may be measured. The first phase 211 may have a specific time and/or distance interval. During the time and/or distance interval, the maximum delta of the transverse and/or longitudinal acceleration of the vehicle 100 is determined and stored. Furthermore, the minimum measured value 207 and the maximum measured value 206 of the lever sensor 110 (for example in each case a resistance value) within the time and/or distance interval of the first phase 211 may be determined and stored.

In a successive second phase 212 (which likewise has a specific time and/or distance interval), the minimum measured value 207 and the maximum measured value 206 may likewise be determined and stored. Furthermore, the accumulated distance or the accumulated time for which the measured values 202 of the lever sensor 100 are (substantially) at the minimum measured value 207 or at the maximum measured value 206 of the first phase 211 may be determined. Consequently, proportion information that indicates the proportion of the time and/or distance interval of the second phase 212 in which the measured values 202 of the lever sensor 110 lie in the minimum value range 209 or in the maximum value range 208 can be determined. This proportion is typically synonymous with or identical to the proportion of the measured values 202 of the lever sensor 110 of the second phase 212 that lie in the minimum value range 209 or in the maximum value range 208.

One or more indications of an impairment of the lever sensor 110 can then be determined. One indication, given by way of example, of an impairment of the lever sensor 110 is that the minimum measured value 207 of the second phase 212 corresponds to the minimum measured value 206 of the first phase 211 (for example deviates by less than 2% or 1%) and/or that the maximum measured value 206 of the second phase 212 corresponds to the maximum measured value 207 of the first phase 211 (for example deviates by less than 2% or 1%). A further indication of an impairment of the lever sensor 110 is that the determined accumulated distance and/or time (in which the measured values 202 of the lever sensor 110 lie in the minimum value range 209 or in the maximum value range 208) is greater than a specific threshold value.

On the basis of the one or more indications, the occurrence of an impaired, in particular stuck, lever sensor 110 can be deduced in an efficient and reliable way.

Figure 3:
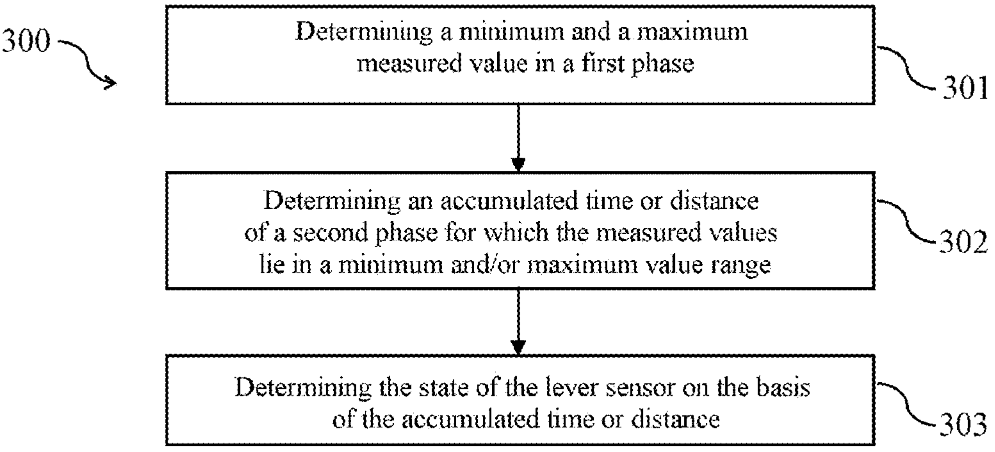
FIG. 3 shows a flow diagram of a method, given by way of example, for detecting an impairment of a lever sensor; and, FIG. 4 shows a progression, given by way of example, of the longitudinal and/or transverse acceleration of a vehicle.

FIG. 3 shows a flow diagram of a (possibly computer-implemented) method 300, given by way of example, for detecting an impairment of a lever sensor 110. The lever sensor 110 is set up to record measured values 202 with respect to the filling level of a liquid container 104 of a motor vehicle 100. The method 300 may be performed by a device 101 of the vehicle 100.

The method 300 comprises the determining 301 of the maximum measured value 206 and the minimum measured value 207 of the lever sensor 110 in the time and/or distance interval of a first phase 211 of the method 300. The first phase 211 may extend over a specific time interval (for example between 5 and 10 minutes) and/or over a specific distance interval of the distance traveled by the vehicle 100 (for example between 5 and 10 km).

In the time and/or distance interval of the first phase 211, measured values 202 of the lever sensor 110 may be repeatedly determined, for example at a specific measuring rate (for instance at a measuring rate of one measured value 202 per 10 seconds or more, or at a measuring rate of one measured value 202 per second or more). It is consequently possible to provide for a sequence of points in time and/or points over a distance of the first phase 211 a corresponding sequence of measured values 202 (i.e. a measurement signal 200). Furthermore, the maximum measured value 206 and the minimum measured value 207 of this sequence of measured values 202 may be determined.

The method 300 may also comprise the determining of a minimum value range 209 for or around the minimum measured value 207 of the first phase 211 and a maximum value range 208 for or around the maximum measured value 206 of the first phase 211. The value ranges 208, 209 may in this case be respectively restricted to ±10% or less, or ±5% or less, or ±2% or less around the maximum measured value 206 or around the minimum measured value 207. The minimum value range 209 may possibly exclusively comprise the minimum measured value 207, and/or the maximum value range 208 may possibly only comprise the maximum measured value 206. This may be the case in particular whenever the lever sensor 110 is designed only to provide a discrete number N of different measured values 202 (for example N equal to 70 or less, or N equal to 60 or less).

Furthermore, the method comprises the determining 302, in a second phase 212 following the first phase 211, of proportion information with respect to the proportion of the time and/or distance interval of the second phase 212 for which the measured values 202 of the lever sensor 110 lie within the minimum value range 209 and/or within the maximum value range 208. It is possible to determine for a sequence of points in time and/or points over a distance of the time and/or distance interval of the second phase 212 a corresponding sequence of measured values 202 of the lever sensor 110. This sequence of measured values 202 may be considered as an overall set. Which proportion of measured values 202 from this overall set lie in the minimum value range 209 and/or in the maximum value range 208 can then be determined as proportion information.

The method 300 also comprises the detecting 303 of an impairment of the lever sensor 110 on the basis of the proportion information. For this purpose, the determined proportion may be compared with a proportion threshold value, and it can be determined on the basis of the comparison whether or not there is an impairment of the lever sensor 110. In this way, particularly efficient and reliable monitoring of a lever sensor 110 can be brought about.

The present disclosure is not restricted to the exemplary embodiments shown. In particular, it should be noted that the description and the figures are only intended to illustrate the principle of the proposed methods, devices and systems by way of example.

LIST OF REFERENCE SIGNS

100 Vehicle
101 (Evaluating or control) device
102 Movement sensor
104 Liquid container
105 Liquid
110 Lever sensor
111 Measuring unit
112 Float
113 Lever
200 Measurement signal
201 Time/distance
202 Measured value
205 Averaged measured-value progression
206 Maximum measured value
207 Minimum measured value
208 Maximum value range
209 Minimum value range
211 First phase
212 Second phase
300 Method for detecting an impairment of a lever sensor
301-303 Method steps
402 Acceleration
401 Acceleration progression
406 Maximum acceleration value
407 Minimum acceleration value

The invention claimed is:

1. A device for detecting an impairment of a lever sensor, comprising:

a lever sensor to record measured values with respect to a filling level of a liquid container of a motor vehicle, and a control unit configured to:

determine a maximum measured value and a minimum measured value of the lever sensor in a time and/or distance interval of a first phase, determine in a second phase, following the first phase, proportion information with respect to a proportion of a time and/or distance interval of the second phase for which the measured values of the lever sensor lie within a minimum value range for the minimum measured value of the first phase and/or within a maximum value range for the maximum measured value of the first phase; and detect an impairment of the lever sensor on the basis of the proportion information.

2. The device according to claim 1, the control unit further configured to:

compare the determined proportion of the time and/or distance interval of the second phase with a proportion threshold value; and, determine on the basis of the comparison whether or not there is an impairment of the lever sensor.

3. The device according to claim 2, wherein the proportion threshold value is 10% or greater.

4. The device according to claim 2, the control unit further configured to:

determine that there is an impairment of the lever sensor if the determined proportion is equal to or greater than the proportion threshold value; and/or to determine that there is no impairment of the lever sensor if the determined proportion is less than the proportion threshold value.

5. The device according to claim 1, the control unit further configured to:

determine a first proportion of the time and/or distance interval of the second phase for which the measured values of the lever sensor lie within the minimum value range;

determine a second proportion of the time and/or distance interval of the second phase for which the measured values of the lever sensor lie within the maximum value range; and, determine on the basis of the first proportion and on the basis of the second proportion, whether or not there is an impairment of the lever sensor.

6. The device according to claim 5, the control unit further configured to:

determine on the basis of the sum of the first proportion and the second proportion, whether or not there is an impairment of the lever sensor.

7. The device according to claim 1, wherein:

the minimum value range around the minimum measured value of the first phase is limited to values which lie ±10% or less around the minimum measured value of the first phase; and/or, the maximum value range around the maximum measured value of the first phase is limited to values which lie ±10% or less around the maximum measured value of the first phase.

8. The device according to claim 1, the control unit further configured, on the basis of movement data of a movement sensor of the vehicle, to identify:

a time and/or distance interval for the first phase in which a longitudinal and/or transverse acceleration of the vehicle changes by at least a predefined change threshold value; and/or, determine whether or not the longitudinal and/or transverse acceleration of the vehicle changes by at least a predefined change threshold value within the time and/or distance interval of the first phase; and to only use the maximum measured value and the minimum measured value of the lever sensor of the first phase for detecting an impairment of the lever sensor whenever the longitudinal and/or transverse acceleration of the vehicle changes by at least the predefined change threshold value within the time and/or distance interval of the first phase.

9. The device according to claim 1, the control unit further configured to:

determine the maximum measured value and the minimum measured value of the lever sensor in the time and/or distance interval of the second phase;

compare the minimum measured value of the second phase with the minimum measured value of the first phase;

compare the maximum measured value of the second phase with the maximum measured value of the first phase; and, detect on the basis of the comparisons an impairment of the lever sensor.

10. The device according to claim 1, the control unit further being configured to:

execute a measure if it is detected that the lever sensor has an impairment, wherein the measure comprises:

an input in a fault memory of the vehicle; and/or an output of a message to a user of the vehicle.

11. The device according to claim 1, the control unit further configured to:

determine that the minimum measured value of the first phase corresponds to a minimum possible measured value of the lever sensor;

detect that liquid is removed from the liquid container after the first phase; and, determine on this basis that there is an impairment of the lever sensor.

12. The device of claim 1, wherein the liquid container is a fuel container for receiving a fuel for the operation of an internal combustion engine of the vehicle.

13. A motor vehicle comprising:

a liquid container for receiving an operating fluid of the vehicle;

a lever sensor to record measured values with respect to a filling level of the operating fluid in the liquid container; and, a control unit according to claim 1, for detecting an impairment of the lever sensor.

14. A method for detecting an impairment of a lever sensor, the lever sensor being set up to record measured values with respect to a filling level of a liquid container of a motor vehicle, the method comprising:

determining a maximum measured value and a minimum measured value of the lever sensor in a time and/or distance interval of a first phase;

determining in a second phase, following the first phase, proportion information with respect to a proportion of a time and/or distance interval of the second phase for which the measured values of the lever sensor lie within a minimum value range for the minimum measured value of the first phase and/or within a maximum value range for the maximum measured value of the first phase; and, detecting an impairment of the lever sensor on the basis of the proportion information.

* * * * *